Jan. 3, 1928.
T. A. CLEMONS
1,654,960
AUXILIARY FUEL SUPPLY ATTACHMENT
Filed May 3, 1926
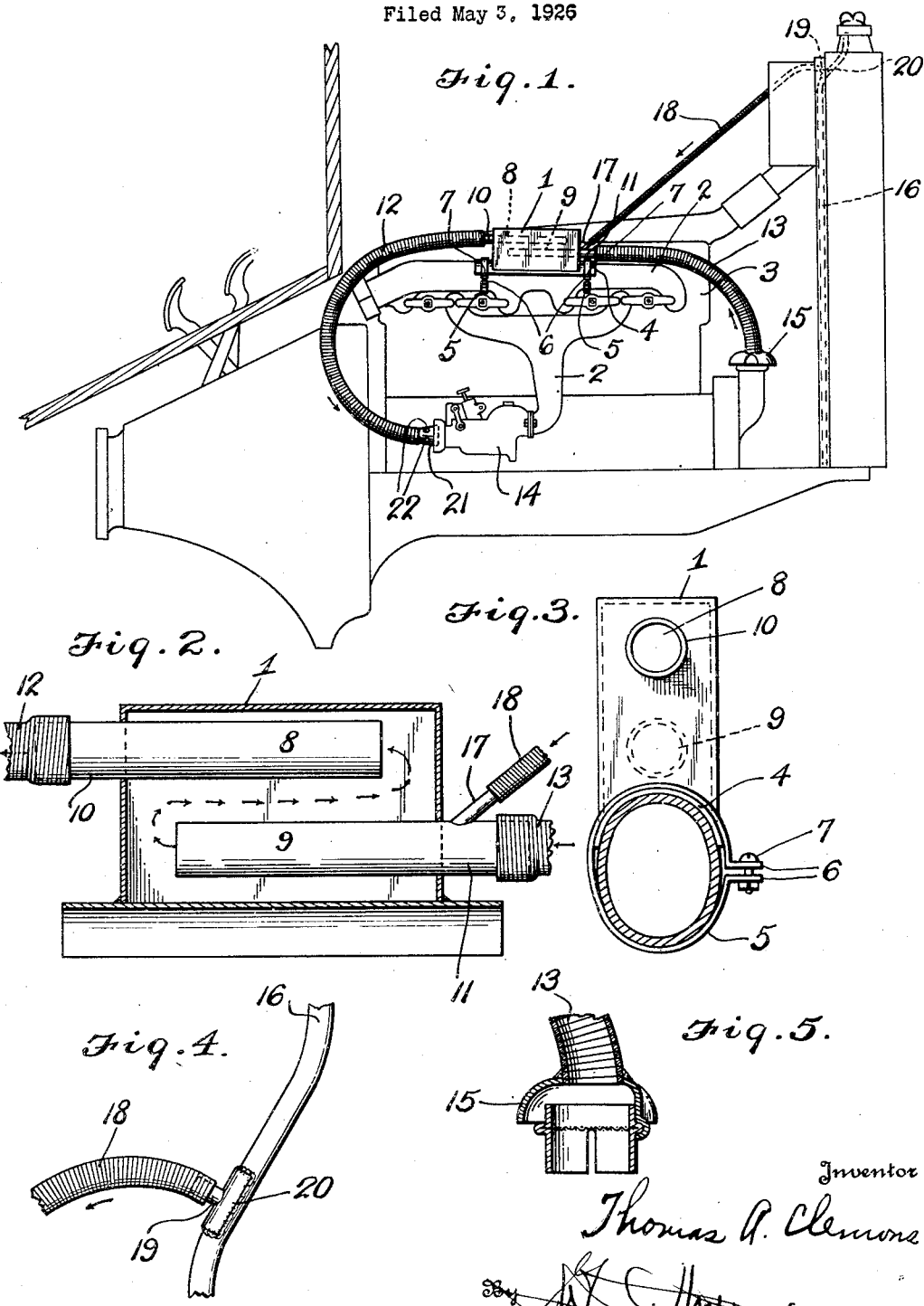

Patented Jan. 3, 1928.

1,654,960

UNITED STATES PATENT OFFICE.

THOMAS A. CLEMONS, OF YALE, OKLAHOMA, ASSIGNOR OF ONE-HALF TO H. C. WARDEN, OF OILTON, OKLAHOMA.

AUXILIARY FUEL-SUPPLY ATTACHMENT.

Application filed May 3, 1926. Serial No. 106,580.

The invention relates to an auxiliary fuel supply attachment for Ford cars and similar automobiles.

The object of the present invention is to improve the construction of auxiliary fuel supply devices for automobiles and to provide a simple, practical and efficient device of strong, durable and comparatively inexpensive construction adapted to be readily applied to Ford cars or similar machines and capable of taking all steam and gas out of the crank case and steam from the rdiator and of mixing the same with air into a fuel and thereby eliminating all waste and affording more mileage from the gas consumed and better lubrication from the oil supply to the machine making the motor run better and tending to eliminate carbon caused by the explosions in the motor.

With these and other objects in view, the invention consists in the construction and novel combination and arrangement of parts hereinafter fully described, illustrated in the accompanying drawings and pointed out in the claim hereto appended, it being understood that various changes in the form, proportion and minor details of construction, within the scope of the claim, may be resorted to without departing from the spirit or sacrificing any of the advantages of the invention.

In the drawings:—

Figure 1 is a side elevation of an auxiliary fuel supply attachment constructed in accordance with this invention and shown applied to an automobile engine.

Fig. 2 is an enlarged longitudinal sectional view of the heater.

Fig. 3 is an end elevation of the same.

Fig. 4 is a detail view illustrating the manner of connecting the device with the overflow pipe of the radiator.

Fig. 5 is a detail view illustrating the connection of the device with the breather cap of the crank case.

In the accompanying drawings in which is illustrated the preferred embodiment of the invention, the auxiliary fuel supply device comprises in its construction a heater 1 of approximately rectangular form supported upon the exhaust manifold 2 of the engine 3 of an automobile and provided at the bottom with a transversely curved plate 4 which saddles the exhaust manifold and conforms to the configuration of the same. The curved plate 4 is expanded beyond the ends of the heater 1 and is secured to the exhaust manifold by metal straps 5 extending around the exhaust manifold as clearly indicated in Fig. 1 of the drawing and having out-turned terminals forming ears or lugs 6 which are pierced by a bolt 7 forming an adjustable connection between the ends of the metallic straps and adapted to enable the heater to be firmly clamped on the exhaust manifold. By this construction the heater may be easily and quickly applied to an automobile and is securely mounted thereon when in use. The bottom of the heater may conform to the configuration of the exhaust manifold and partake of the curvature of the plate 4 as illustrated in Fig. 3 of the drawing or the plate 4 may be connected to the heater in any other desired manner.

The heater 1 which is constructed of suitable metal is provided with upper and lower approximately horizontal tubular members 8 and 9 arranged in overlapping relation and projecting exteriorly from the opposite ends of the heater to form nipples 10 and 11 for the attachment of flexible metallic tubes 12 and 13 for connecting the heater with the carburetor 14 of the engine and the breather cap 15 of the crank case of the engine. The flexible metallic tube 13 is adapted to take the steam and gas out of the crank case of the engine and convey the said steam and gas to the heater 1 where it commingles and mixes with steam and vapor from the radiator and air from the overflow pipe 16 of the radiator. The overlapping relation of the spaced horizontal tubular members 8 and 9 causes the gas, steam vapors and air to pursue a circuitous course in passing through the heater whereby they are thoroughly commingled and mixed before being conducted to the carburetor 14. The nipple 11 is provided with an auxiliary reduced nipple 17 for the attachment of a flexible metallic tube 18 which is connected with the overflow pipe of the radiator. The overflow pipe is pierced directly beneath the hood for the attachment of the pipe 18 and the latter is provided with a nipple 19 having a transversely curved plate 20 which saddles the overflow pipe and is suitably secured to the same by soldering, welding or the like. The steam and vapor from the radiator passing through the flexible metallic tube 18 which is of less diameter than the metallic tubes 12 and 13 and air entering the lower end of the overflow pipe also passes through the flexible metallic tube 18 into the heater 1. The tube 12 which extends from the heater to the carburetor is provided at its lower end with a suitable nipple 21 which is provided with a plurality of openings 22 for admitting cool air into the mixture as the latter passes into the carburetor thereby causing the mixture to be thoroughly broken up by the hot and cold air coming in contact with each other.

The device is adapted to remove all steam, smoke and gas entering the crank case and it mixes with the same steam from the radiator and air from the bottom of the overflow pipe and breather cap on the crank case. These elements are thoroughly mixed in the heater 1 before they are delivered to the carburetor and the mixture is further improved by the introduction of air through openings 22 as the mixture passes into the carburetor. This mixture is then mixed with the gas which is admitted to the carburetor through the needle valve thereof and the fuel contains a high percentage of moisture which has a tendency to eliminate all carbon trouble caused by explosions in the motor. Also by this process the motor has better lubrication from the fact of removing all vaporized gas, steam and smoke drawn into the crank case and giving the piston rings a better chance by working in pure oil at all times. It has been found by practice that this will increase the mileage of both the gas and oil from twenty five to forty percent over present conditions.

What I claim is:

An auxiliary fuel supply device including a hollow casing seated upon the exhaust manifold, horizontal tubular members extending into the casing from the front and rear of the same and arranged in spaced overlapping relation within the casing one above the other, the front tubular member extending beneath and projecting rearwardly beyond the front of the rear tubular member, said tubular members projecting exteriorly at the front and rear of the casing to form front and rear nipples, a tube connecting the front nipple with the breather cap of the crank case of the engine, a reduced tube connected with the front nipple and communicating with the overflow pipe of the radiator of the engine, and a tube connecting the rear nipple with the carburetor.

In testimony whereof I have hereunto set my hand.

THOMAS A. CLEMONS.